US006679111B2

(12) United States Patent
Shigihama et al.

(10) Patent No.: US 6,679,111 B2
(45) Date of Patent: Jan. 20, 2004

(54) MALFUNCTION DIAGNOSTIC APPARATUS FOR EVAPORATED FUEL PURGE SYSTEM

(75) Inventors: Shingo Shigihama, Aki-gun (JP); Tetsushi Hosokai, Aki-gun (JP); Yoshimi Yamamoto, Aki-gun (JP); Seiji Makimoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/156,954

(22) Filed: May 30, 2002

(65) Prior Publication Data

US 2002/0178791 A1 Dec. 5, 2002

(30) Foreign Application Priority Data

Jun. 1, 2001 (JP) ....................................... 2001-166186

(51) Int. Cl.[7] ............................................... G01M 15/00

(52) U.S. Cl. ............................ 73/118.1; 73/47; 73/49.7

(58) Field of Search ................................ 73/116, 117.2, 73/117.3, 118.1, 119 R, 39, 40, 46, 47, 49.7

(56) References Cited

U.S. PATENT DOCUMENTS

| | | | | |
|---|---|---|---|---|
| 5,553,595 A | * | 9/1996 | Nishioka et al. | 123/648 |
| 5,746,187 A | * | 5/1998 | Ninomiya et al. | 123/520 |
| 5,996,400 A | * | 12/1999 | Nishioka et al. | 73/40.5 R |
| 6,357,288 B1 | * | 3/2002 | Shigihama et al. | 73/118.1 |

FOREIGN PATENT DOCUMENTS

JP 11-336620 12/1999

* cited by examiner

*Primary Examiner*—Eric S. McCall
(74) *Attorney, Agent, or Firm*—Nixon Peabody LLP; Donald R. Studebaker

(57) ABSTRACT

The present invention provides a malfunction diagnostic apparatus for an evaporated fuel purge system in an internal combustion engine, capable of detecting abnormalities such as looseness or clogging in the purge line between a purge valve and an engine intake passage. An electric pump 14 is turned on when a purge valve 5 is in a closed state and a selector valve 20 is in an open state. After the lapse of a given time period Tref, a load-current initial value $I_1$ of the electric pump 14 is detected at the moment switching the selector valve 20 to a closed state. After the lapse of a given time period Tpump, the purge valve 5 is switched to an open state, and a load-current final value at the moment after the lapse of a given time period Tpurge. As in the curve A, when a load current final value $I_{2A}$ is equal to or less than the load current initial value $I_1$, it is determined that the gaseous communication state in the purge line between the purge valve 5 and the intake passage is normal. On the other hand, as in the curves B and C, when load current final values $I_{2B}$ and $I_{2C}$ are greater than the load current initial value $I_1$, it is determined that the gaseous communication state is abnormal. In case of abnormality, when the difference $I_{2B}-I_1$ therebetween is less than a gaseous-communication-state determination threshold $f_{T1}$ as in the curve B, it is determined that the purge line is in an open-air state. If the difference $I_{2C}-I_1$ is equal to or greater than the gaseous-communication-state determination threshold $f_{T1}$ as in the curve C, it is determined that the purge line is in a clogging state.

11 Claims, 10 Drawing Sheets

MALFUNCTION DIAGNOSTIC APPARATUS FOR EVAPORATED FUEL PURGE SYSTEM

TECHNICAL FIELD

The present invention is in the fields of improvement technologies in a malfunction diagnostic apparatus for an internal combustion engine of a vehicle. In particular, the present invention related to a malfunction diagnostic apparatus for an evaporated fuel purge system of an internal combustion engine, intended to release an evaporated fuel from a fuel tank into an intake system during a given engine operating period in order to burn up it in a combustion chamber of the engine.

BACKGROUND OF THE INVENTION

In recent years, automobiles with an engine using a liquid fuel such as gasoline have been equipped with an evaporated fuel purge system adapted to depollute an evaporated fuel generated in a fuel tank by burning it in a combustion chamber of the engine so as to comply with a demand for preventing the evaporated fuel from being released into atmosphere. The evaporated fuel purge system is typically operative to temporarily absorb and hold the evaporated fuel from the fuel tank in a canister and then separate the absorbed fuel from the canister to release it into an engine intake system under a given engine operating condition, so that the evaporated fuel generated in the fuel tank is burnt and depolluted in the combustion chamber.

Further, some evaporated fuel purge systems are provided with a malfunction diagnostic apparatus for diagnosing the presence of an undesirable leakage in the purge system, for example, as disclosed in Japanese Patent Laid-Open Publication No. Hei 11-336620. This malfunction diagnostic apparatus employs a technique in which a certain pressure is applied to a purge line between a fuel tank and a purge valve to diagnose the presence of the leakage therebetween. More specifically, a pressurized air is supplied from an electric pump or motor-driven pump to the purge line through a reference orifice having a reference diameter to pressurize the purge line. Under this state, a load current value of the motor-driven pump is measured to determine a criterion. Then, a pressurized air is supplied from the motor-driven pump to the purge line with bypassing the reference orifice to pressurize the purge line. At that moment, a load current value of the motor-driven pump is measured and compared with the criterion to diagnose the presence of the leakage in the purge line. For example, if the purge line has a certain leakage greater than that caused when an aperture equivalent to the reference orifice is generated in the purge line, the load for the pressurization will be reduced and thereby the load current value of the motor-driven pump becomes smaller than the criterion. In this manner, when the load current value is smaller than the criterion, it is determined that there is a leakage in the purge line.

The above malfunction diagnostic apparatus is operable to diagnose the presence of a leakage in the purge line or the line between the fuel tank and the purge valve. However, the above malfunction diagnostic apparatus has a disadvantage in that it cannot comply with the demand for diagnosing multifunction in looseness, clogging or the like of piping between the purge valve and the engine intake passage.

SUMMARY OF THE INVENTION

In view of the above problem of the conventional malfunction diagnostic apparatus for the evaporated fuel purge system, it is therefore an object of the present invention to provide an improved malfunction diagnostic apparatus for an evaporated fuel purge system capable of detecting any malfunction in looseness, clogging or the like of piping between the purge valve and the engine intake passage.

In order to achieve the above object, according to the present invention, there is provided a malfunction diagnostic apparatus for an evaporated fuel purge system for use in an internal combustion engine, wherein the evaporated fuel purge system includes an evaporated fuel purge line ranging from a fuel tank to an intake passage of the engine, and a purge valve provided in the purge line and adapted to be selectively switched to either one of an open state for allowing the fuel tank to be in gaseous communication with the intake passage and a closed state for preventing the fuel tank from being in gaseous communication with the intake passage. The malfunction diagnostic apparatus comprises: pressurization means for supplying a pressurized air to a first zone of the purge line between the fuel tank and the purge valve; drive means for driving the pressurization means; diagnosis means for diagnosing the presence of a leakage in the first purge-line zone in accordance with a driving load value caused in the drive means during supplying the pressurized air from the pressurization means when a given diagnostic condition is satisfied and the purge valve is in the closed state; and gaseous-communication-state determination means for determining a gaseous communication state in a second zone of the purge line between the purge valve and the intake passage in accordance with the driving load value at the moment after the lapse of a given time period from the time the purge valve is switched from the closed state to the open state, with driving the pressurization means during a given engine operating period. As above, the malfunction diagnostic apparatus according to the present invention includes the gaseous-communication-state determination means operable to detect the gaseous communication state in the second purge-line zone between the purge valve and the intake passage in accordance with the driving load value during supplying the pressurized air from the pressurization means when the purge valve is in the closed state. Thus, in addtion to the diagnosis of the presence of a leakage in the first purge-line zone by the diagnosis means, the normality and abnormality of the gaseous communication state in the second purge-line zone can be reliably detected.

In a first preferred embodiment, the malfunction diagnostic apparatus according to the present invention may further comprises a gaseous communication passage for providing gaseous communication between the pressurization means and the first purge-line zone. The gaseous communication passage includes a first passage having a reference orifice interposed therein, a second passage bypassing the reference orifice; and a shutoff means adapted to be selectively switched to either one of an activated state for shutting off the second passage and a deactivated state for opening the second passage. In this case, the gaseous-communication-state determination means is operable to detect a first driving load value in the drive means at the moment when the shutoff means is switched from the activated state to the deactivated state with the purge valve being in the closed state, and detect a second driving load value in the drive means at the moment after the lapse of a first given time period from the time the purge valve is switched to the open state at the moment after the lapse of a second given time period from the switching operation of the shutoff means, so as to determine the gaseous communication state in the second purge-line zone between the purge valve and the intake passage in accordance with the relationship between the first and second driving load values. According to the above construction, the gaseous-communication-state determination means can determine if the second purge-line zone has malfunctions of the gaseous communication state in accordance with the first and second driving load values. This allows adequate action to be promptly taken to such abnormalities.

The above gaseous-communication-state determination means may be operable to determine that the second purge-line zone between the purge valve and the intake passage is clogged, when the second driving load value is greater than the first driving load value, and the difference between the first and second driving load values is equal to or greater than a given value. According to this construction, the gaseous-communication-state determination means can determine if the second purge-line zone is clogged in accordance with the first and second driving load values.

The gaseous-communication-state determination means may also be operable to determine that the second purge-line zone between the purge valve and the intake passage is wrongly opened to atmosphere, when the second driving load value is greater than the first driving load value, and the difference between the first and second driving load values is less than a given value. According to this construction, the gaseous-communication-state determination means can determine if the second purge-line zone is wrongly opened to atmosphere (for example, due to the looseness of piping) in accordance with the first and second driving load values.

Further, the gaseous-communication-state determination means may be operable to determine that the gaseous communication state in the second purge-line zone between the purge valve and the intake passage is normal, when the second driving load value is equal to or less than the first driving load value.

In the first preferred embodiment, the malfunction diagnostic apparatus may further comprise an air-fuel ratio detecting means for detecting a value associated with air-fuel ratio, and an air-fuel ratio feedback means for performing a feedback control to match an actual air-fuel ratio with a desired air-fuel ratio in accordance with a detection result of the air-fuel ratio detecting means. In this case, the gaseous-communication-state determination means is operable to determine that the gaseous communication state in the second purge-line zone between the purge valve and the intake passage is normal, when the second driving load value at the moment after the lapse of the first given time period is equal to or less than the first driving load value at the moment when the shutoff means is switched to the deactivated state, and a air-fuel ratio feedback correction value in the air-fuel ratio feedback control at the moment after the lapse of the first given time period from the switching operation of the purge valve is equal to or greater than a given value. According to the above construction, the normality of the gaseous communication state in the second purge-line zone can be determined in accordance with the detection of the normality in the gaseous communication state by the gaseous-communication state determination means and the detection of the transition to rich-side in air-fuel ratio by the air-fuel ratio detecting means. This allows the normality of the gaseous communication state to be detected with higher level of accuracy.

In a second preferred embodiment, the malfunction diagnostic apparatus according to the present invention may further comprise a gaseous communication passage for providing gaseous communication between the pressurization means and the first purge-line zone. The gaseous communication passage includes a first passage having a reference orifice interposed therein, a second passage bypassing the reference orifice, and a shutoff means adapted to be selectively switched to either one of an activated state for shutting off the second passage and a deactivated state for opening the second passage. In this case, the diagnosis means is operable to diagnose the presence of a leakage in the first purge-line zone between the fuel tank and the purge valve in accordance with the relationship between a first driving load value in the drive means at the moment when the shutoff means is switched from the activated state to the deactivated state, and a second driving load value in the drive means at the moment after the lapse of a given time period from the switching operation of the shutoff means. According to the above construction, the diagnosis means can specify conditions for diagnosing the presence of the leakage in the first purge-line zone. This allows the presence of the leakage in the first purge-line zone to be diagnosed with a high level of accuracy.

The above diagnosis means may be operable to diagnose that the first purge-line zone between the fuel tank and the purge valve includes a relatively small leakage, when the difference between the first and second driving load value at the moment after the lapse of a first given time period from the switching operation of the shutoff means is equal to or less than a first given value. The diagnosis means may also be operable to diagnose that the first purge-line zone between the fuel tank and the purge valve includes a relatively small leakage, when the difference between the first and second driving load value is greater than a first given value, and the difference between the first driving load value and a third driving load value at the moment after the lapse of a second given time period from the switching operation of the shutoff means is equal to or less than a second given value greater than the first given value, the second given time period being greater than the first given time period. In addition, the diagnosis means may be operable to determine that the second purge-line zone between the purge valve and the intake passage is normal without any leakage, when the difference between the first and second driving load value is greater than the second given value. According to the above constructions, the diagnosis means can variously diagnose the normality and abnormality in terms of leakage in the first purge-line zone. This allows the presence and level of the leakage in the first purge-line zone to be diagnosed with a high level of accuracy.

DETAILED DESCRIPTION OF THE PREFERRED EMBODIMENT

Embodiments of the present invention will now be described.

Figure 1:
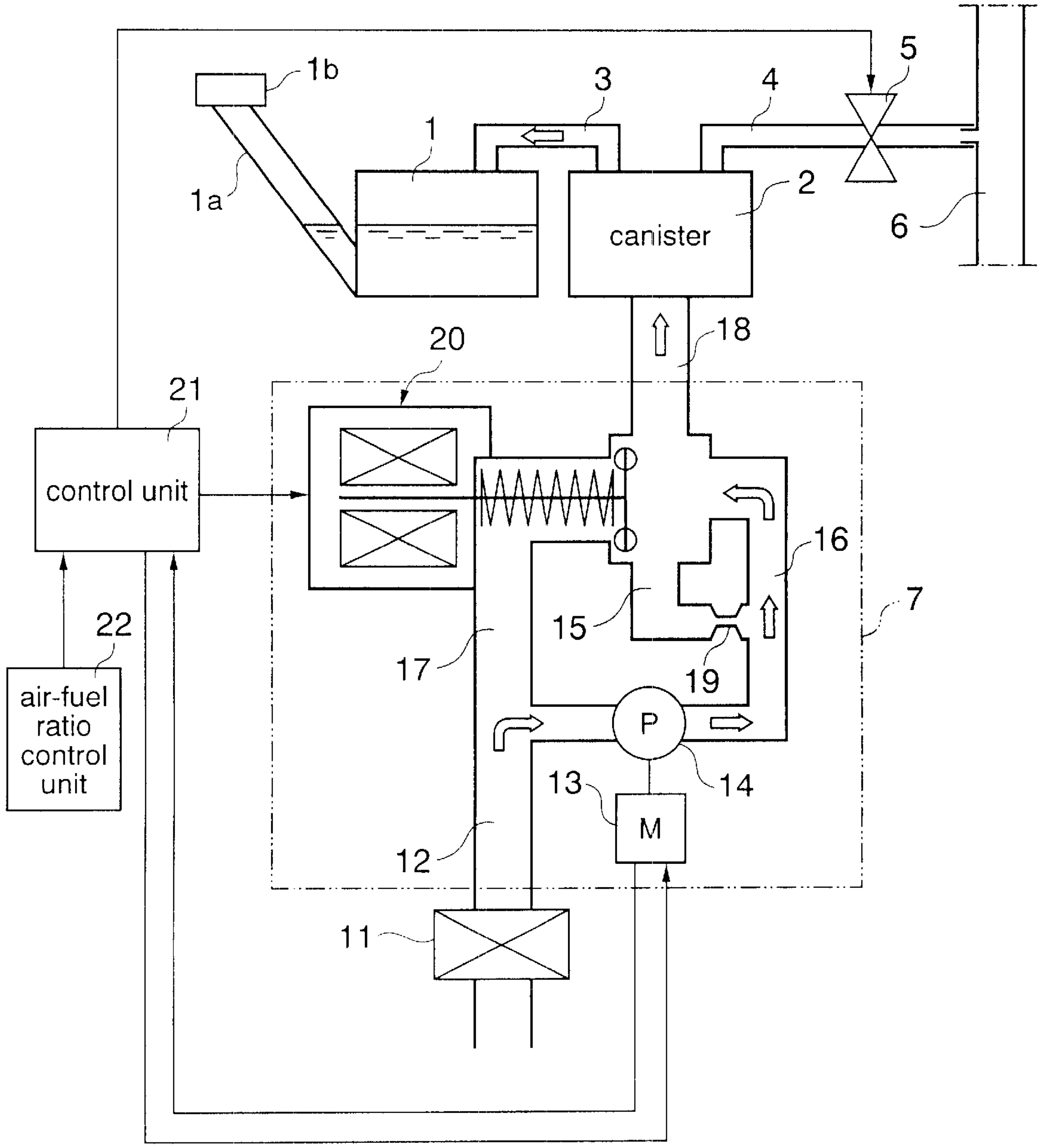
FIG. 1 is a schematic diagram showing a malfunction diagnostic apparatus for an evaporated fuel purge system according to one embodiment of the present invention.

As shown in FIG. 1, an evaporated-fuel guide passage 3 is connected with the upper portion of a fuel tank 1 for reserving a liquid fuel such as gasoline to collect an evaporated fuel generated in the fuel tank 1 and guide it into a canister 2, and a purge passage 4 having an upstream end connected with the canister 2 is connected to an intake passage 6 of an engine (not shown) through a purge valve 5 to make up a purge line. The end of a fuel tube 1*a* extending obliquely upward from the sidewall of the fuel tank 1 is closed by a filler cap 1*b*. The purge line is provided with a diagnostic unit 7 for diagnosing malfunctions in the purge line.

The diagnostic unit 7 includes an air guide passage 12 interposing a filter 11 therein, an motor-driven pump 14 driven by a motor 13, first and second passages 15 and 16 each in gaseous communication with the air guide passage 12 through the motor-driven pump 14, and a third passage 17 directly in gaseous communication with the air guide passage 12. These first, second and third passages 15, 16 and 17 are jointed together at their downstream side and then connected to the canister 2 through a fourth passage 18. The motor-driven pump 14 is operable to pressurize an air introduced through the filter 11 and the air guide passage 12 and supply the pressurized air to the purge line along the white arrows shown in FIG. 1 so as to pressurize the purge line.

Figure 2:
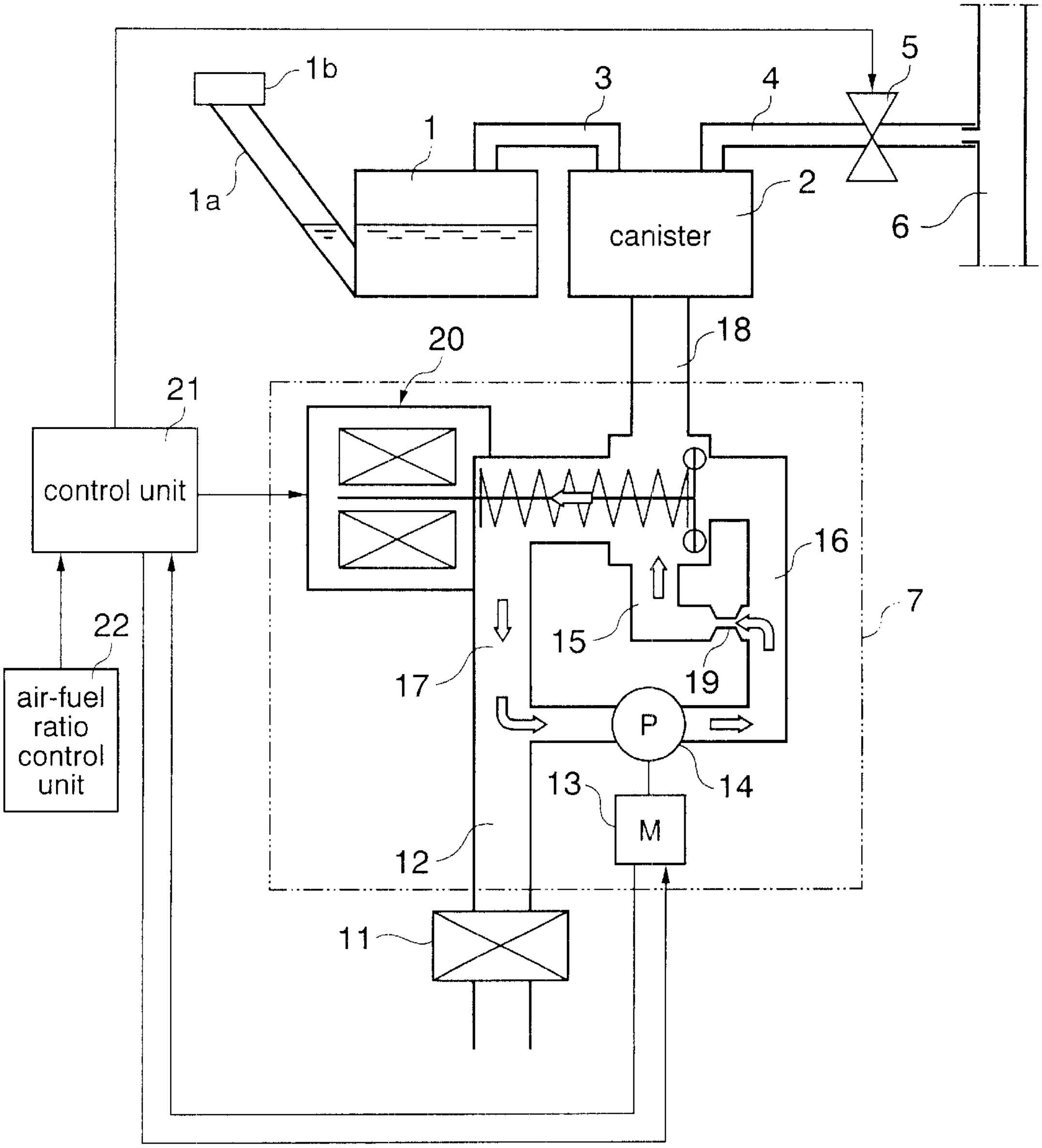
FIG. 2 is a schematic diagram showing the malfunction diagnostic apparatus in the state when a selector valve is in an open state and a pressurized air is supplied through a reference orifice.

A reference orifice 19 having a diameter of 0.5 mm is interposed in the first passage 15, and a selector valve 20 is provided at the junction region of the first, second and third passages 15, 16, 17. The selector valve 20 is adapted to connect the fourth passage 12 selectively to each of the first, second and third passages 15, 16, 17. More specifically, in a closed state shown in FIG. 1, the selector valve 20 is operative to shut off the third passage 17 and bring the first and second passages 15, 16 into gaseous communication with the fourth passage 18. In an open state shown in FIG. 2, the selector valve 20 is operative to shut off the second passage 16 and bring the first and third passages 15, 17 into gaseous communication with the fourth passage 18.

Figure 3:
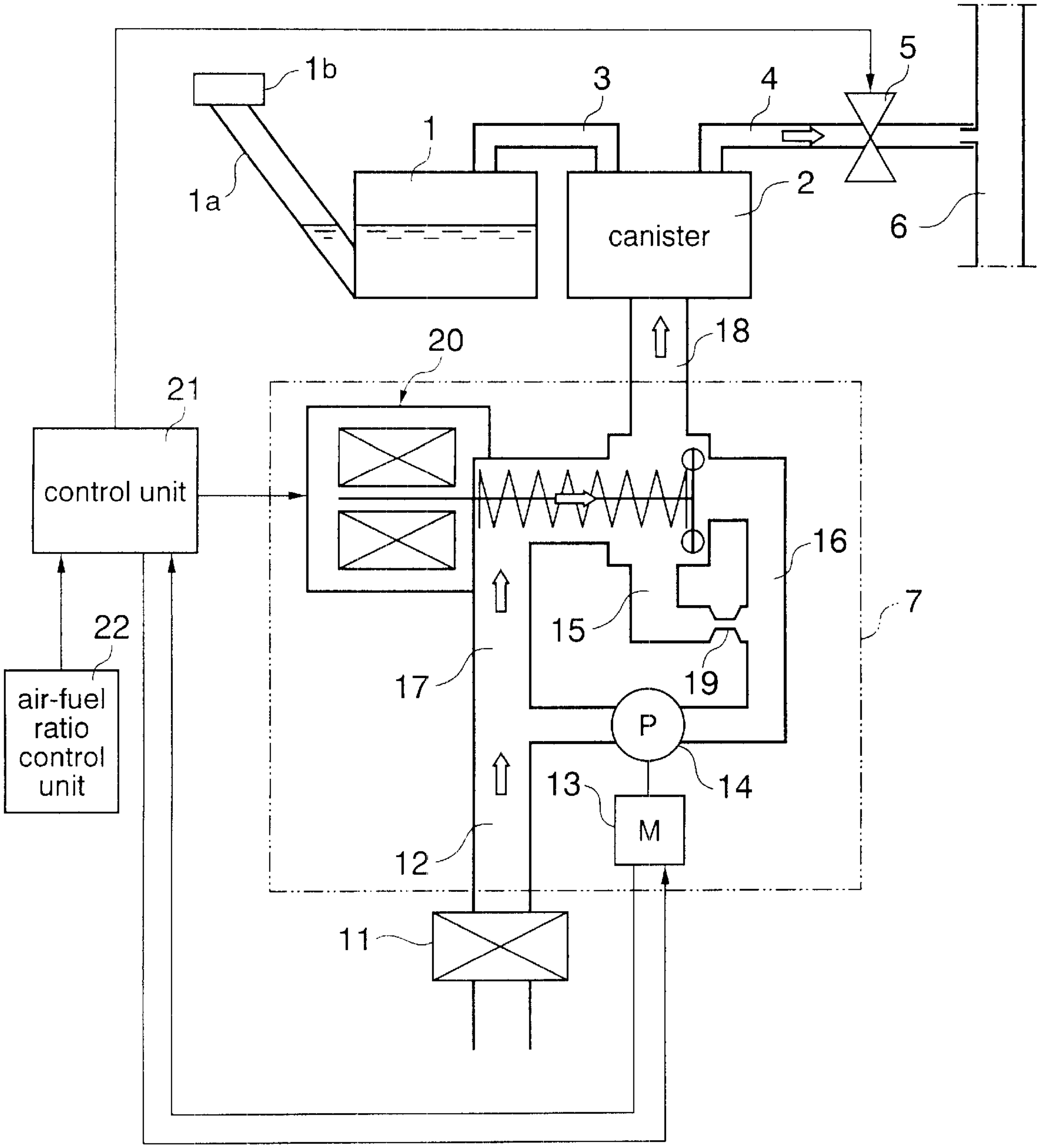
FIG. 3 is a schematic diagram showing the malfunction diagnostic apparatus in the state when the selector valve is in the open state and a purge valve is in an open state.

Further, as shown in FIG. 3, when the selector valve 20 is switched to the open state and the purge valve 5 is switched to an open state under a given engine operating condition, the evaporated fuel adsorbed and held in the canister 2 is separated therefrom by the air introduced through the filter 11 and the air guide passage 12. Then, the evaporated fuel is released to the engine intake passage 6 together with the air through the purge passage 4 and the purge valve 5 along the white arrows shown in FIG. 3, so that the evaporated fuel generated in the fuel tank 1 can be burnt and depolluted in an engine combustion chamber.

A vehicle according to this embodiment of the present invention is equipped with a computerized control unit 21 adapted to provide control or operation signals, respectively, to the purge valve 5, the motor 13, and the selector valve 20, and to receive load current value signals of the motor-driven pump 14 from the motor 13 and air-fuel ratio feedback correction signals from a air-fuel ratio control unit 22.

With reference to flow charts shown in FIGS. 4 to 7, one example of a control operation according to the control unit 21 for diagnosing malfunctions in an evaporated fuel purge system will be described below. The multifunction diagnosis described below is characteristically operable to diagnose the presence of a leakage in a first zone of the purge line between the fuel tank 1 and the purge valve 5, in addition to detecting a gaseous communication state in a second zone of the purge line between the purge valve 5 and the intake passage 6.

Figure 4:
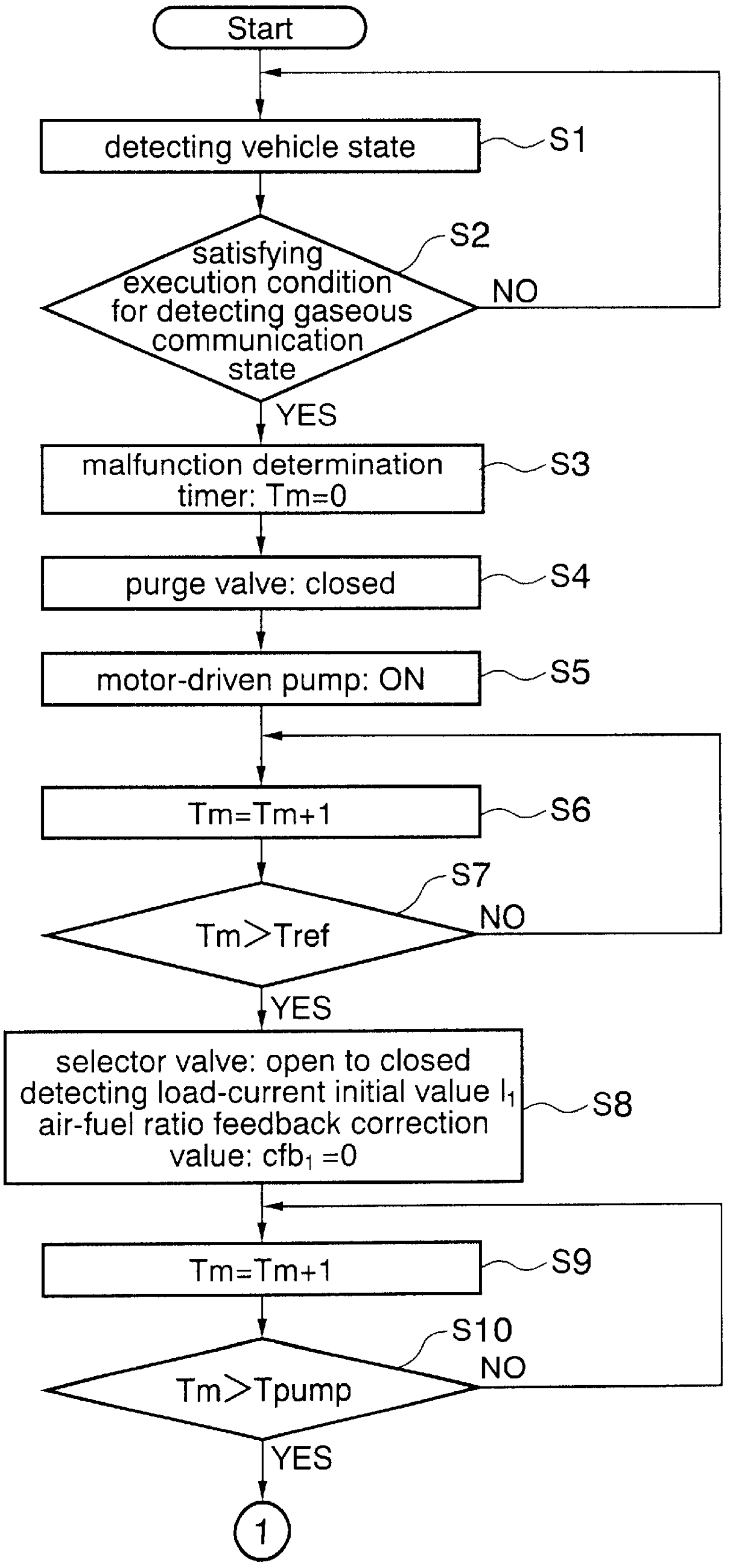
FIG. 4 is a flow chart showing one example of a process for detecting a gaseous communication state in the evaporated fuel purge system.
Figure 5:
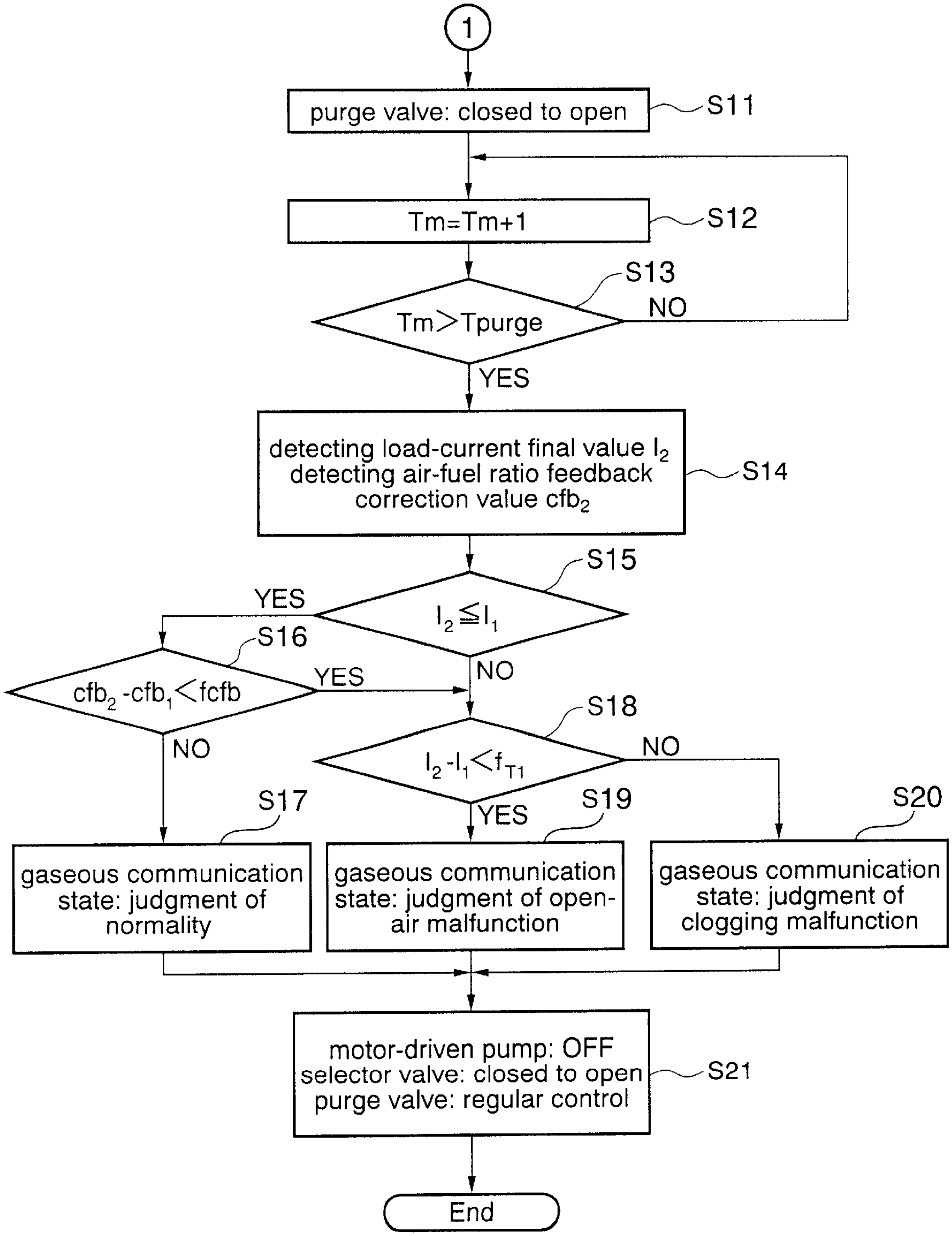
FIG. 5 is a flow chart subsequent to FIG. 4.

Referring to FIGS. 4 and 5, a process for detecting the gaseous communication state in the second purge-line zone between the purge valve 5 and the intake passage 6 will first be described.

In step S1, the control unit 21 detects a vehicle state. Then, in step S2, the control unit 21 determines if an execution condition for detecting the gaseous communication state is satisfied. The execution condition for detecting the gaseous communication state herein may include various conditions, for example, whether an outside-air temperature is in a given range, whether an battery voltage is in a given range, whether a remaining fuel amount in the fuel tank 1 is in a given range, whether a throttle valve opening is equal to or less than a given value, whether a engine speed is in a given range, whether the engine is operated under a suitable condition for executing the purge, and whether malfunction-diagnosing devices such as the motor-driven pump 14, the selector valve 20 are normal. When it is determined that the execution condition for detecting the gaseous communication state is not satisfied, the process returns to step S1. On the other hand, when the execution condition is satisfied, the process proceeds to step S3.

In step S3, a timer value of a malfunction determination timer Tm is reset at zero. Then, in step S4, an operation signal is provided to the purge valve 5 to bring the purge valve 5 into a closed state. In step S5, an operation signal is provided to the motor 13 to turn on or activate the motor-driven pump 14.

Subsequently, in step S6, the timer value of the malfunction determination timer Tm is increased by one, and, in step S7, it is determined if the timer value of the malfunction determination timer Tm is greater than a predetermined reference value Tref. When it is determined that the timer value is equal to or less than the reference value Tref, the process returns to step S6 and the above processing will be repeated. On the other hand, when it is determined that the timer value is greater than the reference value Tref, the process proceeds to step S8.

In step S8, the selector valve 20 is then switched from the open state to the closed state to bring the second passage 16 into gaseous communicate with the fourth passage 18 and supply a pressurized air from the motor-driven pump 14 so as to pressurize the first purge-line zone between the fuel tank 1 and the purge valve 5. At that moment, a load-current initial value $I_1$ of the motor-driven pump 14, i.e. a driving load value caused in the motor 13 during supplying the pressurized air from the motor-driven pump 14, is detected. Simultaneously, an air-fuel ratio feedback correction value $cfb_1$ detected through the air-fuel ratio control unit 22 is reset at zero. This air-fuel ratio feedback correction value $cfb_1$ is a correction value which is calculated in accordance with the deviation between an actual air-fuel ratio detected by an $O_2$ sensor provided in an exhaust passage (not shown) and a desired air-fuel ratio during execution of an air-fuel ratio feedback control.

Then, in step S9, the timer value of the malfunction determination timer Tm is increased by one, and, in step S10, it is determined if the timer value of the malfunction determination timer Tm is greater than a predetermined reference value Tpump. When it is determined that the timer value is equal to or less than the reference value Tpump, the process returns to step S9 and the above processing will be repeated. On the other hand, when it is determined that the timer value is greater than the reference value Tpump, the process proceeds to step S11.

In step S11, the purge valve 5 is switched from the closed state to the open state. Then, in step S12, the timer value of the malfunction determination timer Tm is increased by one, and, in step S13, it is determined if the timer value of the malfunction determination timer Tm is greater than a predetermined reference value Tpurge. When it is determined that the timer value is equal to or less than the reference value Tpurge, the process returns to step S12 and the above processing will be repeated. On the other hand, when it is determined that the timer value is greater than the reference value Tpurge, the process proceeds to step S14.

At that moment, a load-current final value $I_2$ of the motor-driven pump 14 and an air-fuel ratio feedback correction value $cfb_2$ are detected in step S14.

Then, in step S15, it is determined if the load-current final value $I_2$ is equal to or less than the load-current initial value $I_1$. When it is determined that the load-current final value $I_2$ is equal to or less than the load-current initial value $I_1$, it is then determined in step S16 if the difference between the air-fuel ratio feedback correction value cfb2 detected in step S14 and the air-fuel ratio feedback correction value cfb1 detected in step S8 is less than a rich-level determination threshold fcfb. When it is determined that the difference is equal to or greater than the rich-level determination threshold fcfb, the gaseous communication state is determined as normal, in step S17.

On the other hand, in both cases where the step S15 has a determination that the load-current final value $I_2$ is greater than the load-current initial value $I_1$ and the step S16 has a determination that the difference between the air-fuel ratio feedback correction value $cfb_2$ detected in step S14 and the air-fuel ratio feedback correction value $cfb_1$ detected in step S8 is less than the rich-level determination threshold fcfb, the process proceeds to step S18. Then, in step S18, it is determined if the difference between the load-current final value $I_2$ and the load-current initial value $I_1$ is less than a predetermined gaseous-communication-state determination threshold $f_{T1}$.

In step S18, when it is determined that the difference between the load-current final value $I_2$ and the load-current initial value $I_1$ is less than the gaseous-communication-state determination threshold $f_{T1}$, it will be determined in step S19 that the second purge-line zone between the purge valve 5 and the intake passage 6 is in an open-air state, i.e. a state of being wrongly opened to atmosphere. On the other hand, when it is determined that the difference is equal to or greater than the gaseous-communication-state determination threshold $f_{T1}$, it will be determined in step S20 that the second purge-line zone between the purge valve 5 to the intake passage 6 is in a clogging state.

After the steps S17, S19 and S20, the process proceeds to step S21 in either case. In step S21, the motor-driven pump 14 is turned off, or deactivated, and the selector valve 20 is switched from the closed state to the open state. Further, the purge valve 5 is switched to operate based on a regular control. Then, the process for detecting the gaseous communication state is complete.

Figure 6:
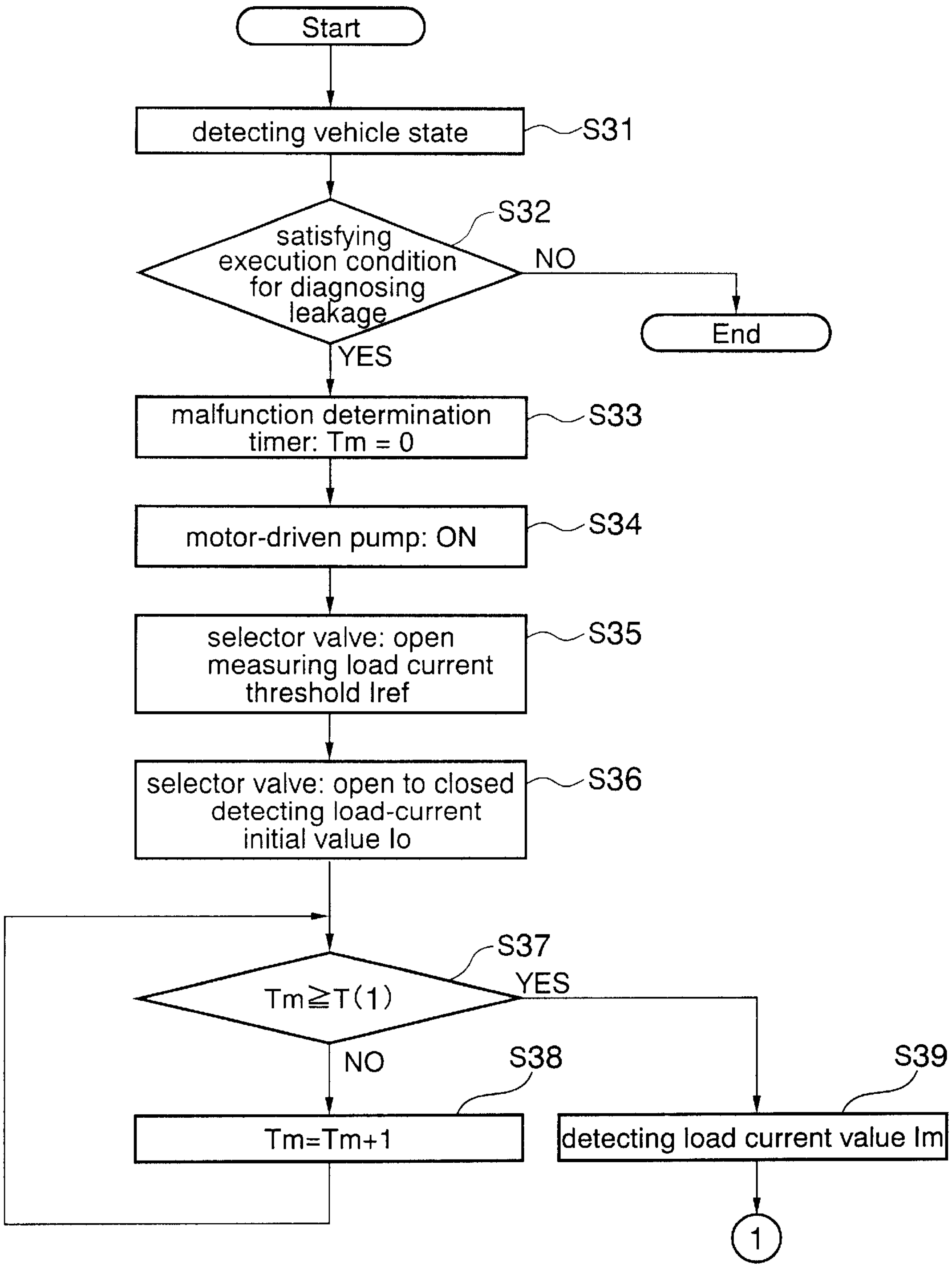
FIG. 6 is a flow chart showing one example of a process for diagnosing the presence of a leakage in the evaporated fuel purge system.
Figure 7:
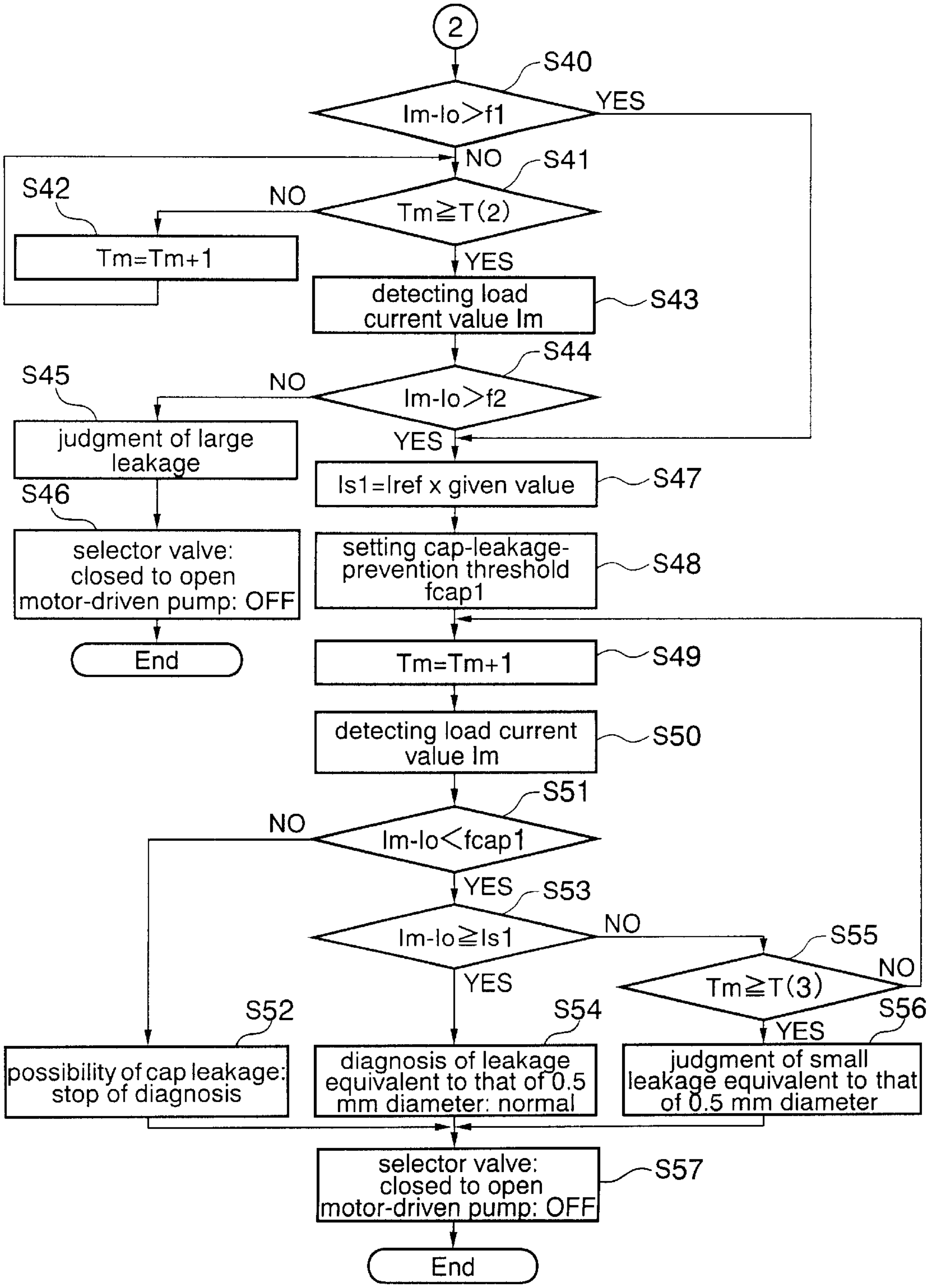
FIG. 7 is a flow chart subsequent to FIG. 6.

With reference to FIGS. 6 and 7, a process for diagnosing the presence of a leakage in the first purge-line zone between the fuel tank 1 and the purge valve 5 will be described below.

In step S31, a vehicle state is detected. Then, in step S32, it is determined if an execution condition for diagnosing the leakage is satisfied. The execution condition for diagnosing the leakage herein may include various conditions, for example, whether the engine is in a stopped state, whether an estimated outside-air temperature is in a given range, whether a remaining fuel amount in the fuel tank 1 is in a given range, and whether malfunction-diagnosing devices such as the motor-driven pump 14, the selector valve 20 are normal. When it is determined that the execution condition for diagnosing the leakage is not satisfied, the diagnostic process is finished. On the other hand, when the execution condition is satisfied, the process proceeds to step S33.

In step S33, the timer value of the malfunction determination timer Tm is reset at zero. Then, in step S34, an operation signal is provided to the motor 13 to turn on the motor-driven pump 14.

Then, in step S35, the selector valve 20 is switched to the open state to shut off the second passage 16, and the air introduced through the filter 11 is supplied through the reference orifice 19 provided in the first passage 15 with pressurizing the air by the motor-driven pump 14. At that moment, a load-current threshold Iref of the motor-driven pump 14 is measured.

Subsequently, in step S36, the selector valve 20 is switched from the open state to the closed state to bring the second passage 16 into gaseous communication with the fourth passage 18, and the pressurized air is supplied from the motor-driven pump 14 to the first purge-line zone between the fuel tank 1 and the purge valve 5. At that moment, the load-current initial value Io of the motor-driven pump 14 is detected.

In step S37, it is then determined if the timer value of the malfunction determination timer Tm is equal to or greater than a first predetermined determination threshold T(1). When it is determined that the timer value is less than the first determination threshold T(1), the timer value is increased by one in step S38 and the process returns to step S37.

On the other hand, when the timer value of the malfunction determination timer Tm is equal to or greater than the first determination threshold T(1), a load current value Im of the motor-driven pump 14 at that moment is detected in step S39.

Then, in step S40, it is determined if the difference Im−Io between the load current value Im and the load-current initial value Io is greater than a large-leakage determination threshold f1 used as a criterion for determining the presence of a relatively large leakage. Specifically, the large-leakage determination threshold f1 is defined in advance in accordance with the remaining fuel amount and the difference Iref−Io between the load-current threshold Iref and the load-current initial value Io. That is, the difference Im−Io is a leakage diagnostic parameter. Thus, when the first purge-line zone between the fuel tank 1 and the purge valve 5 is pressurized by the motor-driven pump 14, the difference Im−Io is varied depending on the presence of a leakage. For example, if there is a leakage, the load of the motor-driven pump 14, or the load current value Im, becomes lower as compared with that in case of no leakage, and thereby the leakage diagnostic parameter Im−Io will be varied.

In step S40, when it is determined that the leakage diagnostic parameter Im−Io is equal to or less than the large-leakage determination threshold f1, it is then determined in step S41 if the timer value of the malfunction determination timer Tm is equal to or greater than a second predetermined determination threshold T(2). When it is determined that the timer value of the malfunction determination timer Tm is less than the second determination threshold T(2), the timer value is increased by one in step S42 and the process returns to step S41. On the other hand, when it is determined that the timer value is equal to or greater than the second determination threshold T(2), the load current value Im of the motor-driven pump 14 at that moment is detected in step S43.

Subsequently, in step S44, it is determined if the leakage diagnostic parameter Im−Io is greater than a 1-mm-diameter-leakage determination threshold f2 for used as a criterion of the presence of a relatively large leakage (e.g. a leakage equivalent to that caused by an aperture having about 1 mm diameter). The 1-mm-diameter-leakage determination threshold f2 is defined in advance in accordance with the remaining fuel amount and the difference Iref−Io between the load-current threshold Iref and the load-current initial value Io.

In step S44, when it is determined that the leakage diagnostic parameter Im−Io is less than the 1-mm-diameter-leakage determination threshold f2, it is then determined in step S45 that there is a relatively large leakage in the first purge-line zone. Then, in step S46, the selector valve 20 is switched from the closed state to the open state, and the motor-driven pump 14 is turned off to complete the diagnostic process.

On the other hand, in both cases where the step S40 has a determination that the leakage diagnostic parameter Im−Io is greater than the large-leakage determination threshold f1, and the step S44 has a determination that the leakage diagnostic parameter Im−Io is greater than the 1-mm-diameter-leakage determination threshold f2, the process proceeds to step S47.

Specifically, in step S47, a pressurization-stop threshold Is1 used as a criterion for determining the stop of pressurizing the first purge-line zone by the motor-driven pump 14 is calculated by multiplying the load-current threshold Iref by a given value.

Then, in step S48, a filler-cap-leakage prevention threshold fcap1 is set. The filler-cap-leakage prevention threshold fcap1 is determined in accordance with the remaining fuel amount in the fuel tank 1 to provide a threshold of occurrence of a liquid fuel leakage from the filler cap 1*b*.

In step S49, the timer value of the malfunction determination timer Tm is increased by one. Then, the load current value Im of the motor-driven pump 14 at that moment is detected in step S50.

Subsequently, in step S51, it is determined if the leakage diagnostic parameter Im−Io is less than the filler-cap-leakage prevention threshold fcap1. When it is determined that the leakage diagnostic parameter is equal to or greater than the filler-cap-leakage prevention threshold fcap1, it is then determined in step S52 that there is a possibility of a fuel leakage from the filler cap 1*b* to stop the diagnostic process.

On the other hand, when it is determined that the leakage diagnostic parameter Im−Io is less than the filler-cap-leakage prevention threshold fcap1, it is then determined in step S53 if the leakage diagnostic parameter Im−Io is equal to or greater than the pressurization-stop threshold Is1. When it is determined that the leakage diagnostic parameter is equal to or greater than the pressurization-stop threshold Is1, it is then determined in step 54 that the first purge-line zone is normal without any leakage equivalent to that caused by an aperture of 0.5 mm diameter.

In step S53, when it is determined that the leakage diagnostic parameter Im−Io is less than the pressurization-stop threshold Is1, it is then determined in step S55 if the timer value of the malfunction determination timer Tm is equal to or greater than a third determination threshold T(3). When it is determined that the timer value is less than the third determination threshold T(3), the process returns to step S49. On the other hand, when it is determined that the timer value is equal to or greater than the third determination threshold T(3), it is hen determined in step S56 that the first purge-line zone has a relatively small leakage equivalent to that caused by an aperture of 0.5 mm diameter.

After the steps S52, S54 and S56, the process proceeds to step S57 in either case. In step 57, the selector valve 20 is switched from the closed state to the open state and the motor-driven pump 14 is turned off to finish the diagnostic process.

Figure 8:
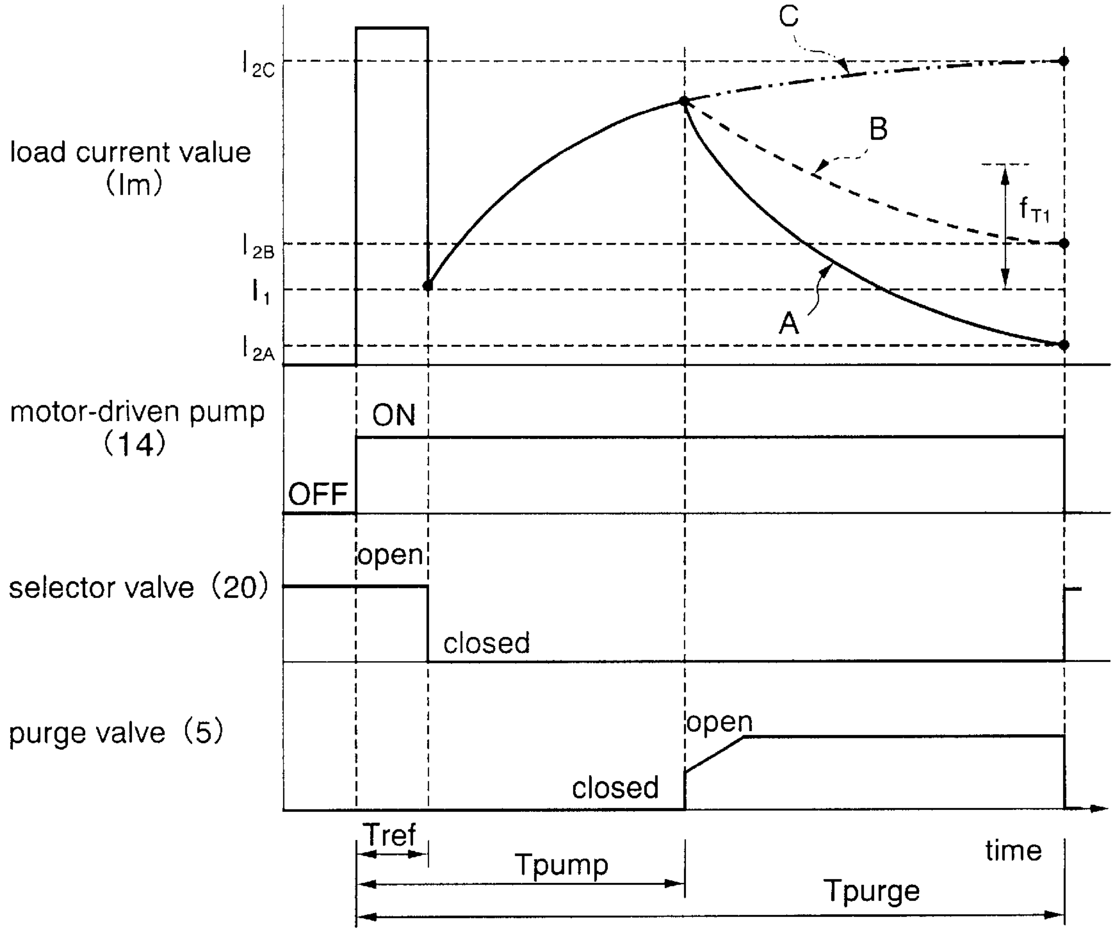
FIG. 8 is a time chart of the process for detecting the gaseous communication state.

With reference to FIG. 8, the process flow for detecting the gaseous communication state in the second purge-line zone between the purge valve 5 and the intake passage 6 will be described below.

When the purge valve 5 is in the closed state and the selector valve 20 is in the open state, the motor-driven pump 14 is turned on to supply a pressurized air from the motor-driven pump 14 through the reference orifice 19 provided in the first passage 15. In this case, as shown by the white arrows in FIG. 2, the pressurized air passes through the reference orifice 19 narrowing the first passage. Thus, the load current value Im of the motor-driven pump 14 is sharply increased.

When the selector valve 20 is switched from the open state to the closed state after the lapse of the given time period Tref, the pressurized air is supplied to the first purge-line zone between the fuel tank 1 and the purge valve 5 in a reduced pressure state through the second passage 16 having relatively low restriction, as shown by the white arrows in FIG. 1. Thus, the load current value Im of the motor-driven pump 14 is sharply reduced to exhibit the load-current initial value $I_1$, and then the load current value Im tends to be increased because the first purge-line zone is gradually pressurized.

Subsequently, after the lapse of the given time period Tpump, the purge valve 5 is switched from the closed state to the open state. In this case, when the gaseous communication state in the second purge-line zone between the purge valve 5 and the intake passage 6 is normal, the upstream zone or the first purge-line zone in the pressurized state is normally connected to the intake passage 6 or the downstream zone in a negative pressure state through the purge valve 5. Thus, as in the curve A, the load current value Im of the motor-driven pump 14 is reduced relatively quickly. After the lapse of the given time period Tpurge, the load current value becomes a load-current final value $I_{2A}$ which is equal to or less than the load-current initial value $I_1$.

When the second purge-line zone between the purge valve 5 and the intake passage 6 is in the open-air state, it is assumed that the interior of this intake passage 6 is under substantially atmospheric pressure. Thus, as in the curve B, the load current value Im of the motor-driven pump 14 is more slowly reduced than the curve A. After the elapse of the given time period Tpurge, the load current value becomes a load-current final value $I_{2B}$ which is greater than the load-current initial value $I_1$.

On the other hand, when the second purge-line zone between the purge valve 5 and the intake passage is in the clogging state, the passage of the pressurized air is blocked with respect to the intake passage 6. Thus, as in the curve C, the load current value Im of the motor-driven pump 14 keeps on increasing even after the purge valve 5 is switched to the open state. Then, after the elapse of the given time period Tpurge, the load current value becomes a load-current final value $I_{2C}$ which is greater than the load-current initial value $I_1$ and the load-current final value $I_{2B}$ in the curve B.

As described above, in accordance with the behavior of the load current value Im after the purge valve 5 is switched from the closed state to the open state, the normality and abnormality of the above gaseous communication state can be detected by comparing the load-current final value $I_2$ at the moment after the lapse of the given time period Tpurge with the load-current initial value $I_1$. More specifically, when the load-current final value $I_2$ is equal to or less than the load-current initial value $I_1$, the normality of the gaseous communication state is detected. On the other hand, when the load-current final value $I_2$ is greater than the load-current initial value $I_1$, the abnormality of the gaseous communication state is detected.

Further, when the load-current final value $I_2$ is greater than the load-current initial value $I_1$, it is also determined if the difference $I_2-I_1$ therebetween is less than the predetermined gaseous-communication-state determination threshold $f_{T1}$. More specifically, when the difference $I_2-I_1$ is less than the gaseous-communication-state determination threshold $f_{T1}$ as in the curve B, it is determined that the second purge-line zone between the purge valve 5 and the intake passage 6 is in the open-air state. On the other hand, when the difference $I_2-I_1$ is equal to or greater than the gaseous-communication-state determination threshold $f_{T1}$ as in the curve C, it is determined that the second purge-line zone between the purge valve 5 and the intake passage 6 is in the clogging state.

When the normality of the gaseous communication state is detected, the predetermined rich-level determination threshold fcfb may be, but not shown in FIG. 8, subsequently compared with the difference between the air-fuel ratio feedback correction value $cfb_2$ detected at the moment after the lapse of the given time period Tpurge and the air-fuel ratio feedback correction value $cfb_1$ detected when the selector valve 20 is switched from the open state to the closed state. In this case, when the difference between the respective air-fuel ratio feedback correction values $cfb_2$ and $cfb_1$ equal to or greater than the rich-level determination threshold fcfb means that the air-fuel ratio feedback control has carried out a correction for increasing the air-fuel ratio at a given level or more, and that the evaporated fuel adsorbed and retained in the canister 2 has been normally released to the intake passage 6 through the purge valve 5. This allows the normality of the gaseous communication state to be detected with higher level of accuracy.

Figure 9:
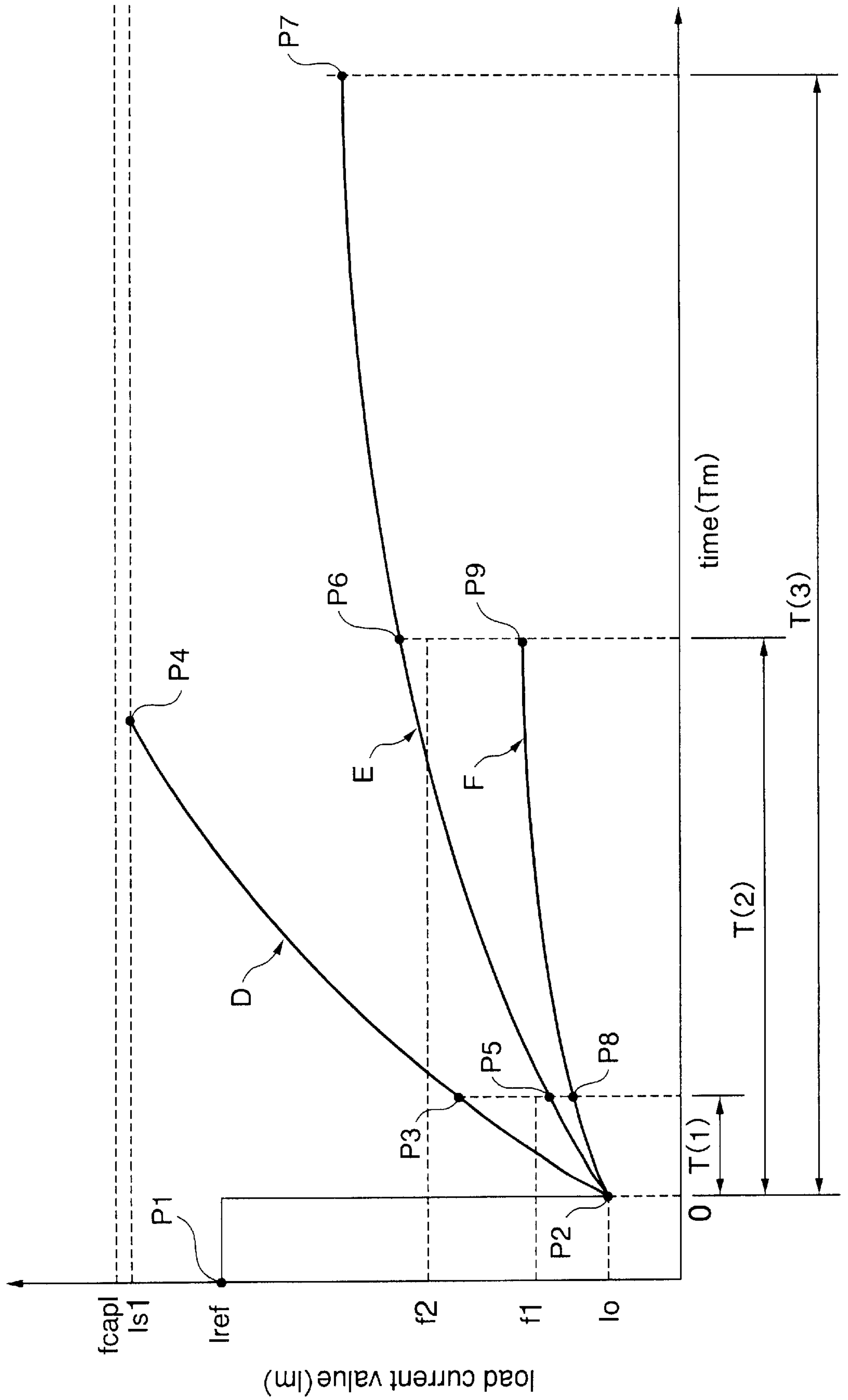
FIG. 9 is a diagram showing the relationship between load current value and time in the process for diagnosing the presence of the leakage.

With reference to FIG. 9, the process flow for diagnosing the presence of the leakage in the first purge-line zone between the fuel tank 1 and the purge valve 5 will be described below.

After the load-current threshold Iref of the motor-driven pump 14 is detected at the point P1, the selector valve 20 is switched from the open state to the closed state, and the load-current initial value Io of the motor-driven pump 14 is detected at the point P2.

In the curve D, when the timer value of the malfunction determination timer Tm is increased up to the determination threshold T(1) at the point P3, it is determined if the leakage diagnostic parameter Im−Io at that moment is greater than the large-leakage determination threshold f1. In this case, the leakage diagnostic parameter Im−Io is greater than the large-leakage determination threshold f1. Thus, the pressurization-stop threshold Is1 and the filler-cap-leakage prevention threshold fcap1 are calculated.

Then, the load current value Im is detected as the timer value of the malfunction determination timer Tm is increased, and it is determined if the diagnostic parameter Im−Io at that moment is less than the filler-cap-leakage prevention threshold Is1. In this case, the parameter Im−Io is less than the filler-cap-leakage prevention threshold fcap1. Thus, it is then determined if the diagnostic parameter Im−Io is equal to or greater than the pressurization-stop threshold Is1. In this case, the leakage diagnostic parameter Im−Io becomes the same value as the pressurization-stop threshold Is1 at the point P4. Thus, at that moment, it is determined that the first purge-line zone is normal without any leakage, and the diagnostic process is completed.

In the curve E, when the timer value of the malfunction determination timer Tm becomes the first determination threshold T(1) at the point P5, it is determined if the leakage diagnostic parameter Im−Io at that moment is greater than the large-leakage determination threshold f1. In this case, the parameter Im−Io is equal to or less than the large-leakage determination threshold f1. Thus, the timer value of the malfunction determination timer Tm is further increased. Then, when the timer value becomes the second determination threshold T(2) or at the point P6, it is determined if the leakage diagnostic parameter Im−Io at that moment is greater than the 1-mm-diameter-leakage determination threshold f2. In this case, as the parameter Im−Io is greater than the 1-mm-diameter-leakage determination threshold f2. Thus, the pressurization-stop threshold Is1 and the filler-cap-leakage prevention threshold fcap1 are calculated.

Then, the load current value Im is detected as the timer value of the malfunction determination timer Tm is increased, and it is determined if the leakage diagnostic parameter Im−Io is less than the filler-cap-leakage prevention threshold fcap1. In this case, the parameter Im−Io is less than the filler-cap-leakage prevention threshold fcap1. Thus, it is determined that the filler cap 1*b* has no malfunction of fuel leakage. Then, it is determined if the timer value of the malfunction determination timer Tm is equal to or greater than a third determination threshold T(3). When the timer value of the malfunction determination timer Tm becomes the third determination threshold T(3) or at the point P7, it is determined that the first purge-line zone has a leakage equivalent to that caused by an aperture of 0.5 mm diameter, and the malfunction diagnosis is complete.

In the curve F, when the timer value of the malfunction determination timer Tm becomes the first determination threshold T(1) at the point P8, it is determined if the leakage diagnostic parameter Im−Io is greater than the large-leakage determination threshold f1. In this case, the parameter Im−Io is less than the large-leakage determination threshold f1, the timer value of the malfunction determination timer Tm is further increased. Then, when the timer value becomes the second determination threshold T(2) or at the point P9, it is determined if the leakage diagnostic parameter Im−Io at that moment is greater than the 1-mm-diameter-leakage determination threshold f2. In this case, the parameter Im−Io is equal to or less than the 1-mm-diameter-leakage determination threshold f2. Thus, it is determined that the first purge-line zone has a large leakage, and the diagnosis process is completed.

As described above, since the gaseous communication state in the second purge-line zone between the purge valve 5 and the intake passage 6 is detected, the abnormality such as the open-air state or the clogging state in the second purge-line zone can be reliably detected to allow adequate action to be promptly taken to these abnormalities.

Further, in the first purge-line zone between the fuel tank 1 and the purge valve 5, any aperture having a diameter equivalent to that of the reference orifice 19 can be reliably detected using the load-current threshold Iref of the motor-driven pump 14 at that moment supplying the pressurized air from the motor-driven pump 14 to the first passage through the reference orifice 19, as a criterion.

Figure 10:
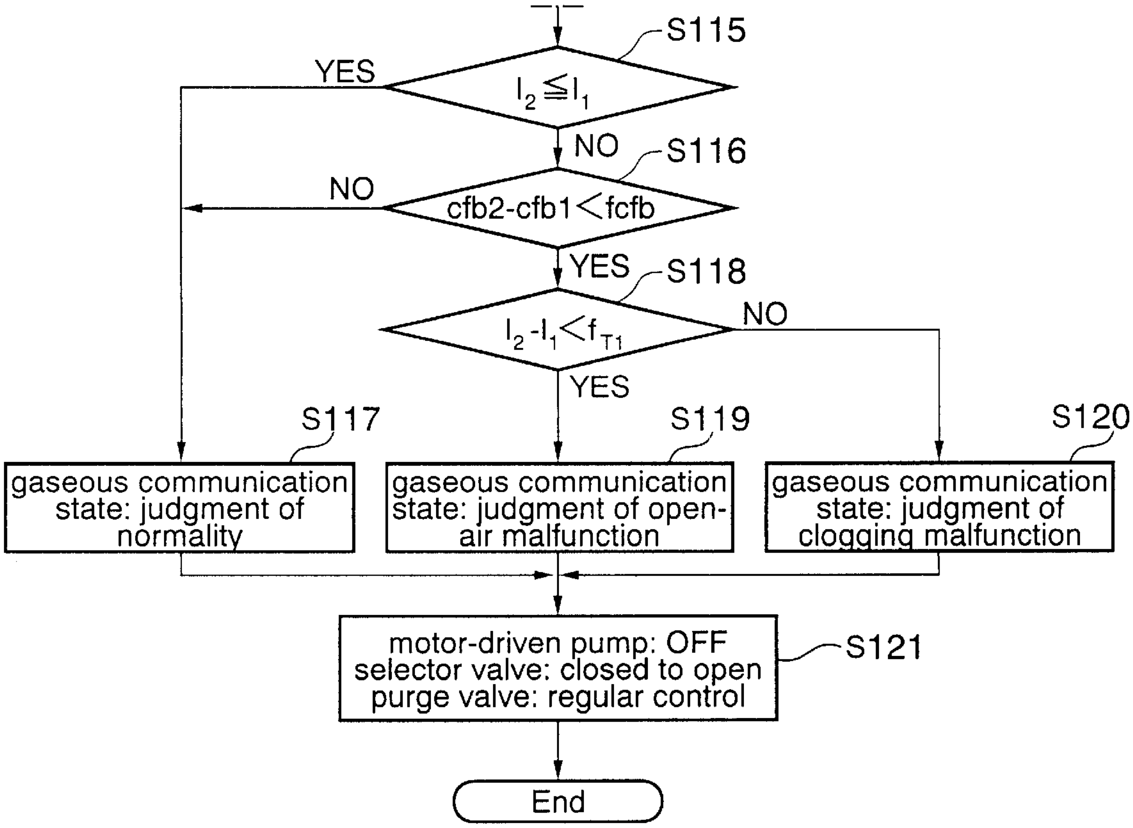
FIG. 10 is a partial flow chart showing one example of a process for detecting the gaseous communication state according to another embodiment of the present invention.

In the aforementioned embodiment, another detection process as shown in FIG. 10 may be used as a substitute for the process for detecting the gaseous communication state in the second purge-line zone between the purge valve 5 and the intake passage 6 as shown in FIG. 5.

In FIG. 5, it is determined in step S15 if the load-current final value $I_2$ is equal to or less than the load-current initial value $I_1$. When it is determined that the load-current final value $I_2$ is equal to or less than the load-current initial value $I_1$, it is then determined in step S16 if the difference between the respective air-fuel ratio feedback correction values cfb2 and cfb1 is less than the predetermined rich-level determination threshold fcfb. When it is determined that the difference is equal to or greater than the rich-level determination threshold fcfb, it is then determined in step S17 that the gaseous communication state is normal. Thus, the normality of the gaseous communication state can be detected with higher level of accuracy.

Differently from the above process, in FIG. 10, it is determined in step S115 if the load-current final value $I_2$ is equal to or less than the load-current initial value $I_1$, and when it is determined that the load-current final value $I_2$ is less than the load-current initial value $I_1$, the process proceeds to step S117. Further, in the step S115, even when it is determined that the load-current final value $I_2$ is greater than the load-current initial value $I_1$, it is then determined in step S116 if the difference between the respective air-fuel ratio feedback correction values cfb2 and cfb1 is less than the rich-level determination threshold fcfb. When it is determined that the difference is greater than the rich-level determination threshold fcfb, the process also proceeds to step S117. In either case, the step S117 has the same determination that the gaseous communication state is normal. Respective processes on and after step S118 are the same as those on and after the step S18 in FIG. 5, respectively.

When it is required to determine the normality of the gaseous communication state with particularly high level of accuracy, the process as shown in FIG. 5 may be carried out. On the other hand, when such a high accuracy is unnecessary, the process as shown in FIG. 10 may be used.

While the gaseous communication state in the second purge-line zone between the purge valve 5 and the intake passage 6 has been determined in accordance with the load current value Im of the motor-driven pump 14 in the above embodiments, it may be determined in accordance with the revolution speed of the motor-driven pump 14, the internal pressure of the fuel tank 1 or the like. Further, while the presence of the leakage in the first purge-line zone between the fuel tank 1 and the purge valve 5 has been determined by the leakage diagnostic parameter Im−Io in accordance with the load current value Im of the motor-driven pump 14 in the above embodiments, it may also be determined in accordance with the revolution speed of the motor-driven pump 14, the internal pressure of the fuel tank 1 or the like. In either case, as with the above embodiments, the gaseous communication state in the second purge-line zone between the purge valve 5 and the intake passage 6 and the presence of the leakage in the first purge-line zone between the fuel tank 1 and the purge valve 5 can be reliably diagnosed.

As described above, according to the present invention, in a malfunction diagnostic apparatus for an evaporated fuel purge system, in which a pressurized air is supplied from a motor-driven pump to one purge-line zone between a fuel tank and a purge valve to diagnose the presence of leakages in the purge-line zone, an improved malfunction diagnostic apparatus is provided which is operable to detect the gaseous communication state in another purge-line zone between the purge valve and the intake passage. Thus, any abnormality such as the open-air state or the clogging state therebetween can be reliably detected to allow adequate action to be promptly taken to such an abnormality. Accordingly, the present invention is widely applicable to the fields of vehicles equipped with a malfunction diagnostic apparatus for an evaporated fuel purge system.

What is claimed is:

1. A malfunction diagnostic apparatus for an evaporated fuel purge system for use in an internal combustion engine, wherein said evaporated fuel purge system includes an evaporated fuel purge line ranging from a fuel tank to an intake passage of said engine, and a purge valve provided in said purge line and adapted to be selectively switched to either one of an open state for allowing said fuel tank to be in gaseous communication with said intake passage and a closed state for preventing said fuel tank from being in gaseous communication with said intake passage, said malfunction diagnostic apparatus comprising:

pressurization means for supplying a pressurized air to a first zone of said purge line between said fuel tank and said purge valve;

drive means for driving said pressurization means;

diagnosis means for diagnosing the presence of a leakage in said first purge-line zone in accordance with a driving load value caused in said drive means during supplying the pressurized air from said pressurization means when a given diagnostic condition is satisfied and said purge valve is in the closed state; and gaseous-communication-state determination means for determining a gaseous communication state in a second zone of said purge line between said purge valve and said intake passage in accordance with the driving load value at the moment after the lapse of a given time period from the time said purge valve is switched from the closed state to the open state, with driving said pressurization means during a given engine operating period.

2. A malfunction diagnostic apparatus as defined in claim 1, which further comprises a gaseous communication passage for providing gaseous communication between said pressurization means and said first purge-line zone, said gaseous communication passage including:

a first passage having a reference orifice interposed therein;

a second passage bypassing said reference orifice; and a shutoff means adapted to be selectively switched to either one of an activated state for shutting off said second passage and a deactivated state for opening said second passage, wherein said gaseous-communication-state determination means is operable to detect a first driving load value in said drive means at the moment when said shutoff means is switched from the activated state to the deactivated state with said purge valve being in the closed state, and detect a second driving load value in said drive means at the moment after the lapse of a first given time period from the time said purge valve is switched to the open state at the moment after the lapse of a second given time period from said switching operation of said shutoff means, so as to determine the gaseous communication state in said second purge-line zone between said purge valve and said intake passage in accordance with the relationship between said first and second driving load values.

3. A malfunction diagnostic apparatus as defined in claim 2, wherein said gaseous-communication-state determination means is operable to determine that said second purge-line zone between said purge valve and said intake passage is clogged, when said second driving load value is greater than said first driving load value, and the difference between said first and second driving load values is equal to or greater than a given value.

4. A malfunction diagnostic apparatus as defined in claim 2, wherein said gaseous-communication-state determination means is operable to determine that said second purge-line zone between said purge valve and said intake passage is wrongly opened to atmosphere, when said second driving load value is greater than said first driving load value, and the difference between said first and second driving load values is less than a given value.

5. A malfunction diagnostic apparatus as defined in claim 2, wherein said gaseous-communication-state determination means is operable to determine that the gaseous communication state in said second purge-line zone between said purge valve and said intake passage is normal, when said second driving load value is equal to or less than said first driving load value.

6. A malfunction diagnostic apparatus as defined in claim 2, which further comprises an air-fuel ratio detecting means for detecting a value associated with air-fuel ratio, and an air-fuel ratio feedback means for performing a feedback control to match an actual air-fuel ratio with a desired air-fuel ratio in accordance with a detection result of said air-fuel ratio detecting means, wherein said gaseous-communication-state determination means is operable to determine that the gaseous communication state in said second purge-line zone between said purge valve and said intake passage is normal, when said second driving load value is equal to or less than said first driving load value, and a air-fuel ratio feedback correction value in said air-fuel ratio feedback control at the moment after the lapse of said first given time period from said switching operation of said purge valve is equal to or greater than a given value.

7. A malfunction diagnostic apparatus as defined in claim 1, which further comprises a gaseous communication passage for providing gaseous communication between said pressurization means and said first purge-line zone, said gaseous communication passage including:

a first passage having a reference orifice interposed therein;

a second passage bypassing said reference orifice; and a shutoff means adapted to be selectively switched to either one of an activated state for shutting off said second passage and a deactivated state for opening said second passage, wherein said diagnosis means is operable to diagnose the presence of a leakage in said first purge-line zone between said fuel tank and said purge valve in accordance with the relationship between a first driving load value in said drive means at the moment when said shutoff means is switched from the activated state to the deactivated state, and a second driving load value in said drive means at the moment after the lapse of a given time period from said switching operation of said shutoff means.

8. A malfunction diagnostic apparatus as defined in claim 7, wherein said diagnosis means is operable to diagnose that said first purge-line zone between said fuel tank and said purge valve includes a relatively large leakage, when the difference between said first and second driving load value is equal to or less than a first given value, said second driving load being detected at the moment after the lapse of a first given time period from said switching operation of said shutoff means.

9. A malfunction diagnostic apparatus as defined in claim 8, wherein said diagnosis means is operable to diagnose that said first purge-line zone between said fuel tank and said purge valve includes a relatively small leakage, when the difference between said first and second driving load value is greater than a first given value, and the difference between said first driving load value and a third driving load value at the moment after the lapse of a second given time period from said switching operation of said shutoff means is equal to or less than a second given value greater than said first given value, said second given time period being greater than said first given time period.

10. A malfunction diagnostic apparatus as defined in claim 9, wherein said diagnosis means is operable to determine that said second purge-line zone between said purge valve and said intake passage is normal without any leakage, when the difference between said first and second driving load value is greater than said second given value.

11. A malfunction diagnostic apparatus for an evaporated fuel purge system for use in an internal combustion engine, wherein said evaporated fuel purge system includes an evaporated fuel purge line ranging from a fuel tank to an intake passage of said engine, and a purge valve provided in said purge line and adapted to be selectively switched to either one of an open state for allowing said fuel tank to be in gaseous communication with said intake passage and a closed state for preventing said fuel tank from being in gaseous communication with said intake passage, said malfunction diagnostic apparatus comprising:

a pump for supplying a pressurized air to a first zone of said purge line between said fuel tank and said purge valve;

a motor for driving said pump; and a control unit for diagnosing the presence of a leakage in said first zone of said purge line in accordance with a driving load value caused in said motor during supplying the pressurized air from said pump when a given diagnostic condition is satisfied and said purge valve is in the closed state, wherein said control unit is adapted to determine a gaseous communication state in a second zone of said purge line between said purge valve and said intake passage in accordance with the driving load value at the moment after the lapse of a given time period from the time said purge valve is switched from the closed state to the open state, with driving said pump during a given engine operating period.

* * * * *